(12) United States Patent
Collins et al.

(10) Patent No.: US 10,824,420 B2
(45) Date of Patent: Nov. 3, 2020

(54) CACHING BUILD GRAPHS

(71) Applicant: Microsoft Technology Licensing, LLC, Redmond, WA (US)

(72) Inventors: Lance J. Collins, Redmond, WA (US); Iman Narasamdya, Duvall, WA (US); Michael W. Pysson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/280,079

(22) Filed: Feb. 20, 2019

(65) Prior Publication Data
US 2020/0264866 A1 Aug. 20, 2020

(51) Int. Cl.
*G06F 8/71* (2018.01)
*G06F 9/54* (2006.01)
*G06F 8/10* (2018.01)
*G06F 9/445* (2018.01)
*G06F 12/0875* (2016.01)
*G06F 12/0891* (2016.01)
*G06F 16/901* (2019.01)

(52) U.S. Cl.
CPC ............... *G06F 8/71* (2013.01); *G06F 8/10* (2013.01); *G06F 9/44505* (2013.01); *G06F 9/54* (2013.01); *G06F 12/0875* (2013.01); *G06F 12/0891* (2013.01); *G06F 16/9024* (2019.01)

(58) Field of Classification Search
CPC ..... G06F 8/71; G06F 8/36; G06F 8/30; G06F 16/9024; G06F 8/10; G06F 9/44505; G06F 9/54; G06F 12/0875; G06F 12/0891
See application file for complete search history.

(56) References Cited

U.S. PATENT DOCUMENTS

| | | | | |
|---|---|---|---|---|
| 5,182,806 A * | 1/1993 | McKeeman | ............... | G06F 8/48 714/38.1 |
| 5,201,050 A * | 4/1993 | McKeeman | ............... | G06F 8/48 717/111 |
| 10,671,384 B1* | 6/2020 | Boynes | ...................... | G06F 8/73 |
| 2002/0040469 A1* | 4/2002 | Pramberger | ............... | G06F 8/71 717/121 |

(Continued)

OTHER PUBLICATIONS

Vincent Pazeller, "Scalab: a Build Tool for Scala" (Year: 2008).*

(Continued)

*Primary Examiner* — Phillip H Nguyen
(74) *Attorney, Agent, or Firm* — Ogilvie Law Firm

(57) ABSTRACT

Software build solutions are tailored to cache a build graph. The build graph is a dependency graph used to guide processes performed during a software build. Build graph caching provides faster builds after changes are made to source code files, allowing the retrieval from cache previously constructed build graph content unaffected by the change. The build graph cache includes a key-value store with an API providing StoreBuildGraph and FetchBuildGraph routines. Keys include fingerprints (hashes) of graph input parameter values, such as specification file paths, enumerated directories, and environment variables. Fingerprints may be combined by concatenation and further hashing. The API may be build-language agnostic. Pseudocode for cache store and fetch routines, and examples of their operation, are disclosed.

20 Claims, 5 Drawing Sheets

(56) References Cited

U.S. PATENT DOCUMENTS

| | | | |
|---|---|---|---|
| 2008/0288622 A1 | 11/2008 | Gordon et al. | |
| 2009/0222697 A1 | 9/2009 | Thakkar et al. | |
| 2016/0253625 A1 | 9/2016 | Casey | |
| 2018/0081652 A1* | 3/2018 | Ahmed | G06F 8/4442 |
| 2018/0218005 A1* | 8/2018 | Kuhtz | G06F 8/44 |

OTHER PUBLICATIONS

Maudoux et al., "Correct, Efficient, and Tailored: The Future of Build Systems" (Year: 2018).*

Kandennir et al., "Cache Topology Aware Computation Mapping for Multicores" (Year: 2010).*

Ryan Hardt, "Ant Build Maintenance with Fornniga" (Year: 2014).*

Annavaram et al., "Data Prefetching by Dependence Graph Precomnputation" (Year: 2001).*

"Ninja", retrieved from <<https://ninja-build.org/>>, Sep. 11, 2017, 2 pages.

"MSBuild", retrieved from <<https://docs.microsoft.com/en-us/visualstudio/msbuild/msbuild>>, Nov. 3, 2016, 9 pages.

"Make (software)", retrieved from <<https//en.wikipedia.org/wiki/Make_(software)>>, Dec. 23, 2018, 9 pages.

"Apache Ant", retrieved from <<https://en.wikipedia.org/wiki/Apache_Ant>>, Dec. 19, 2018, 5 pages.

"Dependency graph", retrieved from <<https://en.wikipedia.org/wiki/Dependency_graph>>, Nov. 10, 2018, 3 pages.

"Best way to hash two values into one?", retrieved from <<https://crypto.stackexchange.com/questions/55162/best-way-to-hash-two-values-into-one>>, Jan. 30, 2018, 6 pages.

"Merkle tree", retrieved from <<https://en.wikipedia.org/wiki/Merkle_tree>>, Jan. 30, 2019, 5 pages.

"Remote Caching", retrieved from <<https://docs.bazel.build/versions/master/remote-caching.html>>, no later than Jan. 30, 2019, 9 pages.

"Build in the Cloud: Distributing Build Steps", retrieved from <<http://google-engtools.blogspot.com/2011/09/build-in-cloud-distributing-build-steps.html>>, Sep. 22, 2011, 7 pages.

"Bazel: FAQ", retrieved from <<https://bazel.build/faq.html>>, no later than Jan. 30, 2019, 8 pages.

"Buck: A high-performance build tool", retrieved from <<https://buckbuild.com/>>, copyright date 2013-2018, 2 pages.

Shane McIntosh, et al., "The Evolution of ANT Build Systems", retrieved from <<https://www.computer.org/csdl/proceedings/msr/2010/6802/00/05463341.pdf>>, 2010, 10 pages.

* cited by examiner

BUILD GRAPH 214

CACHING BUILD GRAPHS

BACKGROUND

Noon In software development, programs are often built from different files, using different operations. For example, a program may be built from source code files using compilation and linking operations. In many situations, different operations are applied to different kinds of files when building a program. For instance, library files are often available in precompiled form, so they are only linked during a given build, rather than being both compiled and linked during the build. Many software programs are built using hundreds, or thousands of individual files. Some commercial software programs are built from tens of thousands of constituent files.

Accordingly, various tools for partially or fully automating build operations have been developed. In some cases, automation of the build of a software program is guided by a main build file, which may also be referred to as a "project file", "configuration file", "build process file", "build dependency file", "makefile", or another name, depending on which build automation tool uses the build file. The build file contains information about what files to use in the build, where to look for those files, what operations to perform on those files, and how to integrate the operational results to build the software program.

Enhancements to software build tools and build techniques directly improve the functionality of a computing system which performs software builds using the enhancements. Software programs that are built using the enhanced tools and techniques also benefit indirectly, because making builds easier, faster, or more efficient aids and encourages innovations in the programs being built.

SUMMARY

As taught herein, some software build tools and processes are tailored to improve computing system memory management functionality. The tailoring includes caching some or all of a build graph. A build graph is a dependency graph that is used to guide compilation, linking, or other processes performed during a software build. Build graph caching can provide a substantially faster build after changes are made to source code files or other software constituents, by allowing the tailored build tool to retrieve from cache memory a previously constructed part of the build graph unaffected by the change in constituents, instead of reconstructing the entire graph.

In some embodiments, a build graph resides at least partially in a digital memory. The build graph contains a representation of dependency relationships between constituent processes of a software build. A build graph cache includes a key-value store which resides at least partially in the memory. The build graph cache also includes an API which provides access to content of the key-value store. A configuration file indicates an entry point of the software build. A StoreBuildGraph routine of the API has code which stores at least a portion of the build graph in the key-value store. The StoreBuildGraph routine has parameters which include or depend upon the portion of the build graph and also include or depend upon at least one of the following: a set of specification file paths, a set of directories enumerated during a specification evaluation, a set of environment variable names. The API also has a FetchBuildGraph routine which fetches build graph content from the key-value store. Of course, one of skill will acknowledge that cache store and fetch routines may have different names as identifiers in different implementations, and yet still have the same or similar functionality as the StoreBuildGraph and FetchBuildGraph routines discussed herein, and hence embody teachings presented herein.

Some embodiments or embodiment environments presented herein provide or utilize actions that provide caching of build graph, such as obtaining a fingerprint fp of content which includes a build entry point of the build graph; getting graph input GI which includes one or more of the following: a set of specification file paths, a set of directories enumerated during a specification evaluation, a set of environment variable names; and iteratively storing fingerprint fp values and corresponding GI values in a key-value store of the build graph cache. In some embodiments, iterative storing includes hash combining fingerprint fp values with fingerprint values of graph input. One of skill will acknowledge that fingerprint and graph input parameters or other variables may have different names as identifiers in different implementations, and yet still have the same or similar functionality as the fp fingerprint and GI graph input variables and their values that are discussed herein, and hence embody teachings that are presented herein.

Other technical mechanisms, structures, and activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
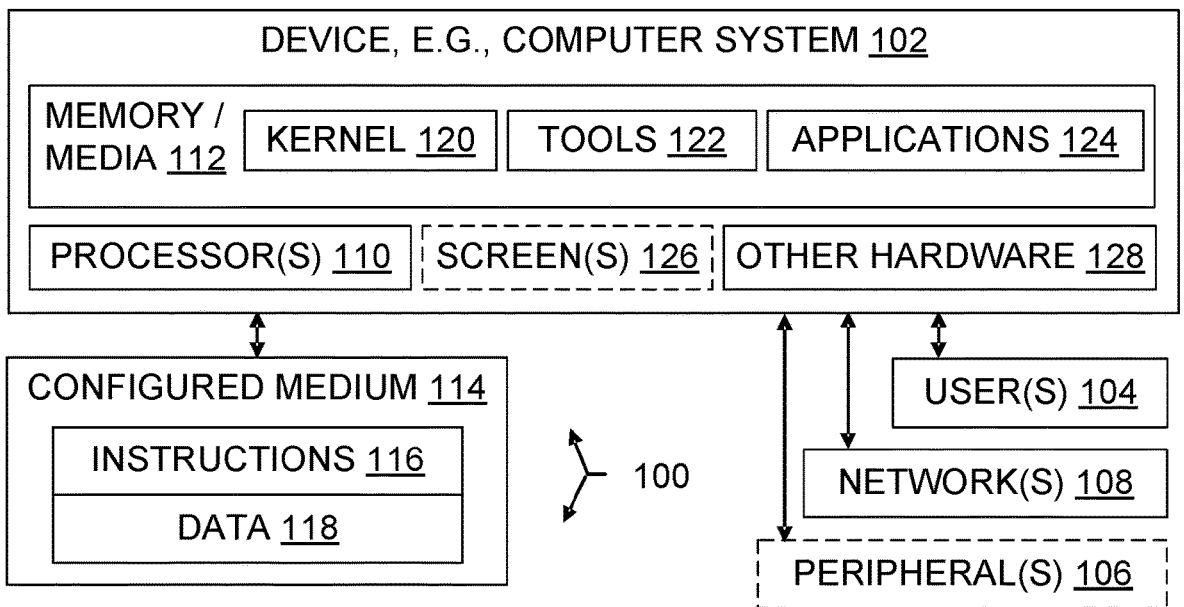
FIG. 1 is a block diagram illustrating a computer system generally and also illustrating a configured storage medium generally.

Many innovations expand beyond their origins, but understanding an innovation's origins can help one more fully appreciate the innovation. In the present case, some teachings presented herein were motivated by a technical challenge of reducing build times for Microsoft software products. This challenge led to investigation of processing time spent constructing build graphs. The inventors conceived technical changes which can reduce processing time spent by not reconstructing portions of a build graph that are not affected by a change in the source code files or other constituents of a software product from one build to the next. The efficiencies are gained by processing unaffected build graph portions in or out of a build graph cache, instead of reconstructing them. Processing build graph nodes may include storing them in the cache, later locating them in the cache, confirming they are still applicable (unaffected by constituent changes), and copying them out of the cache. This build graph cache processing is often much faster than reconstructing build graph nodes. Other technical challenges addressed by the innovations taught here, and other benefits of the teachings provided herein, will also be apparent to one of skill from the discussion provided below. Although building Microsoft products more efficiently was a motivating example, the tools and techniques described herein are not limited to use in supporting that activity. Embodiments may also or alternatively support building software products from other vendors, institutional-sourced products, agency-sourced products, or community-sourced products, for instance.

Some embodiments described herein may be viewed by some people in a broader context. For instance, concepts such as caching, concatenation, dependency, graphs, and hashing, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively cache software build graphs. Other configured storage media, systems, and methods involving caching, concatenation, dependency, graphs, or hashing are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular tools, contexts, identifiers, variables, parameters, fields, hash functions, properties, files, data structures, notations, efficiency levels, cache hit rates, or other implementation choices or results described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as building software, efficiently and correctly propagating the impacts of changes in source code, making and updating dependency graphs for a software build, and implementing tradeoffs in processor usage and memory usage between caching items and reconstructing them, which are all activities deeply rooted in computing technology. In particular, "memory" means digital memory storing bits, and "processor" means an integrated circuit or other circuit which processes bits, so purely mental processes are excluded. Some embodiments improve the functioning of computing systems by reducing the time spent getting a build graph that can then be traversed to perform a software build, without thereby increasing the risk to data stored in memory or executable software produced by the build. Other advantages based on the technical characteristics of the teachings will also be apparent to one of skill from the description provided.

Pseudocode Acronyms and Symbols

Some acronyms, symbols, and terminology conventions used in pseudocode, or elsewhere herein, are defined below. Some were coined for use in describing the innovations presented herein. Some symbols used herein have a particular meaning herein that does not necessarily match other meanings assigned to those symbols in other contexts. One of skill will recognize that different names or symbols may be used in other contexts to describe the same or similar functionality taught herein, and thus reflect teachings provided herein. Other acronyms, symbols, variables, identifiers, conventions, and items used in pseudocode or elsewhere herein may be defined elsewhere herein, or they may not require express definition herein to be understood by one of skill.

The symbol ← represents assignment, as when a value is assigned to a variable.

The symbol = represents equality.

The symbol ¬ represents logical negation, e.g., ¬(1=2) is true.

The symbol − represents a subtraction operation.

The symbol ∈ means "is an element of"; it represents membership in a set.

The symbol ⊗ represents a fingerprint combiner, which may also be referred to as a hash combiner or by a routine name such as CombineFp (a.k.a. "CombineFp( )" when routines are indicated by appended parentheses). The symbol ⊗ also represents fingerprint combination operations, and their results. These operations include at least concatenating hashes and then taking a hash of the result. Additional actions may also be performed in some implementations, e.g., sorting the hashes before concatenating them, adding a salt value before hashing, checking input hashes for validity, and so on.

An expression of the form "X?Y:Z" may be read as "if X then Y else Z". It evaluates to Y when X is true and evaluates to Z when X is false.

CFP represents a fingerprint of a configuration file. It may be passed into a routine as a parameter, or it may be computed inside a routine from a configuration file that is passed to the routine as a parameter.

GI represents graph input which includes or depends upon at least a set of specification file paths, a set of directories enumerated during a specification evaluation, a set of environment variable names, or a combination thereof.

A routine name may be expressly presented as such, e.g., as in "the IsEmpty routine". A routine name may also be designated by appended parentheses, with or without parameters, e.g., as in "IsEmpty( )" or "IsEmpty(GI)".

The terms "fingerprint" and "hash" are used interchangeably herein.

Acronyms, Abbreviations, and Names

Some additional acronyms, abbreviations, and names are defined below. Others are defined elsewhere herein, or do not require definition here in order to be understood by one of skill.

ALU: arithmetic and logic unit
API: application program interface, a.k.a. application programming interface (not limited to use in or with applications that interface directly with human users)
BIOS: basic input/output system
CD: compact disc
CPU: central processing unit
DAG: directed acyclic graph
DVD: digital versatile disk or digital video disc
FPGA: field-programmable gate array
FPU: floating point processing unit
GPU: graphical processing unit
GUI: graphical user interface
ID: identifier
IDE: integrated development environment, sometimes also called an "interactive development environment"
OS: operating system
RAM: random access memory
ROM: read only memory
URL: uniform resource locator Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and in some systems may also be known by another name, such as "task," "process," "coroutine," or even "interrupt handler", for example. In other systems, "process" and "thread" have different meanings from one another, e.g., a process may contain one or more threads. In a given system, the threads may run in parallel, in sequence, or in a combination of parallel execution (e.g., multiprocessing) and sequential execution (e.g., time-sliced). In particular, threads may run "concurrently", meaning that their execution overlaps at least in part, e.g., they may each have access to the same memory location of other resource in a way that requires synchronization or another mechanism to prevent harm from the different ordering of accesses that can occur.

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" by itself and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, services, cloud infrastructure components, middleware, and other code written by programmers (who are also referred to as developers) and/or automatically generated.

"Routine" means a function, method, procedure, or other piece of code which can receive control non-sequentially by being called and then return, e.g., via an address pushed on a call stack. Other than parameterless void routines which neither accept parameters nor return a value, routines also use a stack to receive value(s), to return value(s), or both.

A "function" is a routine which returns a value at the point it was called.

"Service" means a consumable program offering in a cloud computing environment or other network or computing system environment.

"Cloud" means pooled resources for computing, storage, and networking which are elastically available for measured on-demand service. A cloud may be private (e.g., on-premises), public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means "comprises" in the patent law sense) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, build processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as storing a key and value in a cache store, fetching a value from a cache store based on a key, and executing processor instructions, are each understood herein as inherently digital. A human mind cannot interface directly with a CPU or other processor, or with RAM or other digital storage, to read and write the necessary data and perform the necessary operations on digital values such as bits and bytes to perform the build graph caching steps taught herein. This would be well understood by persons of skill in the art in view of the present disclosure, but others may sometimes need to be informed or reminded of the facts.

Unless stated otherwise, at least some embodiments are also presumed to be capable of operating at scale in production environments, or in testing labs for production environments, when appropriately situated and configured, as opposed to being mere thought experiments. For present purposes, "operating at scale" means operating in at least one of the following conditions: caching at least half of a build graph that has at least one thousand nodes, or caching at least half of a build graph which represents at least one thousand constituent processes. For this purpose, and other purposes throughout this document, "caching" includes storing data in a build graph cache, fetching data from a build graph cache, or both.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, asserting, assigning, building, caching, calling, combining, computing, concatenating, constructing, emptying, enumerating, evaluating, evicting, executing, fetching, getting, hashing, negating, obtaining, operating, performing, processing, producing, providing, reconstructing, removing, returning, storing, throwing, traversing, updating (and adds, added, asserts, asserted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; may be further characterized in some situations as a development environment or a production environment, for example
102 computer system, also referred to as computational system or computing system
104 users
106 peripherals
108 network generally
110 processor
112 computer-readable storage medium, e.g., RAM, hard disks
114 removable configured computer-readable storage medium
116 instructions executable with processor; may be on removable storage media or in other memory (volatile or non-volatile or both)
118 data, e.g., data value(s) stored in a data location
120 kernel(s), e.g., operating system(s), BIOS, device drivers
122 tools, e.g., anti-virus software, firewalls, packet sniffer software, intrusion detection systems (IDS), intrusion prevention systems (IPS), software development tools and tool suites (compilers, linkers, debuggers, profilers, etc.), hardware development tools and tool suites
124 applications, e.g., word processors, web browsers, spreadsheets, games, email tools, web apps
126 display screens, also referred to as "displays"
128 computing hardware not otherwise associated with a reference number 106, 108, 110, 112, 114
200 software development environment
202 software build system
204 inputs to software build, e.g., source files
206 build instructions, e.g., makefile or other configuration file that provides an entry point to the build
208 output of software build, e.g., artifacts such as executables
210 storage system
212 blocks or blobs or chunks (blobs are binary large objects)
214 build graph
216 build graph cache
218 build graph cache API
220 Integrated Development Environment (IDE)
300 build graph (DAG) node, e.g., build target node representing an application as a transformation of inputs
302 hash value, a.k.a. hash or fingerprint; 302 also refers to the act of hashing items to produce a hash
304 links to other nodes
306 node type
308 node version
400 build graph caching system, e.g., system 102 enhanced with build graph caching functionality
402 key-value pair
404 store containing key-value pair(s)
406 entry point into build, i.e., point at which build starts
408 specification files, e.g., files which specify build processes, specify build process order, declare build targets, and otherwise identify constituent files and processes used in a software build 410 path to one or more specification files, e.g., file system path, URL 412 directory containing one or more specification files; enumerated during build graph construction; does not necessarily contain specification files 414 environment variable, e.g., PATH, $PATH, % PATH %; the environment variables included in graph input are those that are read during a build graph construction, which will often not be all of the environment variables in a given system 416 fingerprint of system 418 software build 502 StoreBuildGraph routine, or another routine with the same or similar functionality for iteratively storing at least part of a build graph in a build graph cache using a key-value store of the cache 504 FetchBuildGraph routine, or another routine with the same or similar functionality for fetching at least part of a build graph from a build graph cache using a key-value store of the cache 506 code generally; may also refer to specific code, e.g., StoreBuildGraph routine code or FetchBuildGraph routine code, depending on context 508 parameter generally; may also refer to one or more parameters of a specific routine, depending on context 510 assertion generally; may also refer to an assertion of a specific condition, depending on context 512 key usable or used in a key-value store 404

514 value storable or stored in a key-value store 404

516 ContentFp routine or other code which produces a hash of a file's contents

518 PathFp routine or other code which produces a hash of a file's path

520 CombineFp routine, ⊗ operator, fingerprint combiner, hash combiner, or other code which combines hashes; also refers to action of hash combining, e.g., performing operations that transform two or more fingerprints into a result fingerprint, e.g., using CombineFp( )

522 concatenation result, e.g., a concatenation result of 123 with 789 is 123789; another concatenation result of these two values is 789123; a concatenation result may also be referred to simply as a "concatenation"

600 build targets represented in build graph 604 files represented in build graph 606 build artifact file nodes, e.g., node representing an executable 608 source codes in build graph 610 directional links in build graph 700 aspects of a build graph 702 processes to perform during build 704 dependency relationships 706 language used in build graph to document build instructions, dependencies, targets, files 708 construction time or reconstruction time for creating or recreating build graph as a populated data structure in digital memory; may be estimated or actual, and may be processor clock or ticks or wall clock time, depending on embodiment and situation; primarily of interest herein for describing relative timings (time period p1 versus time period p2) as opposed to describing absolute times (e.g., n milliseconds)

Figure 8:
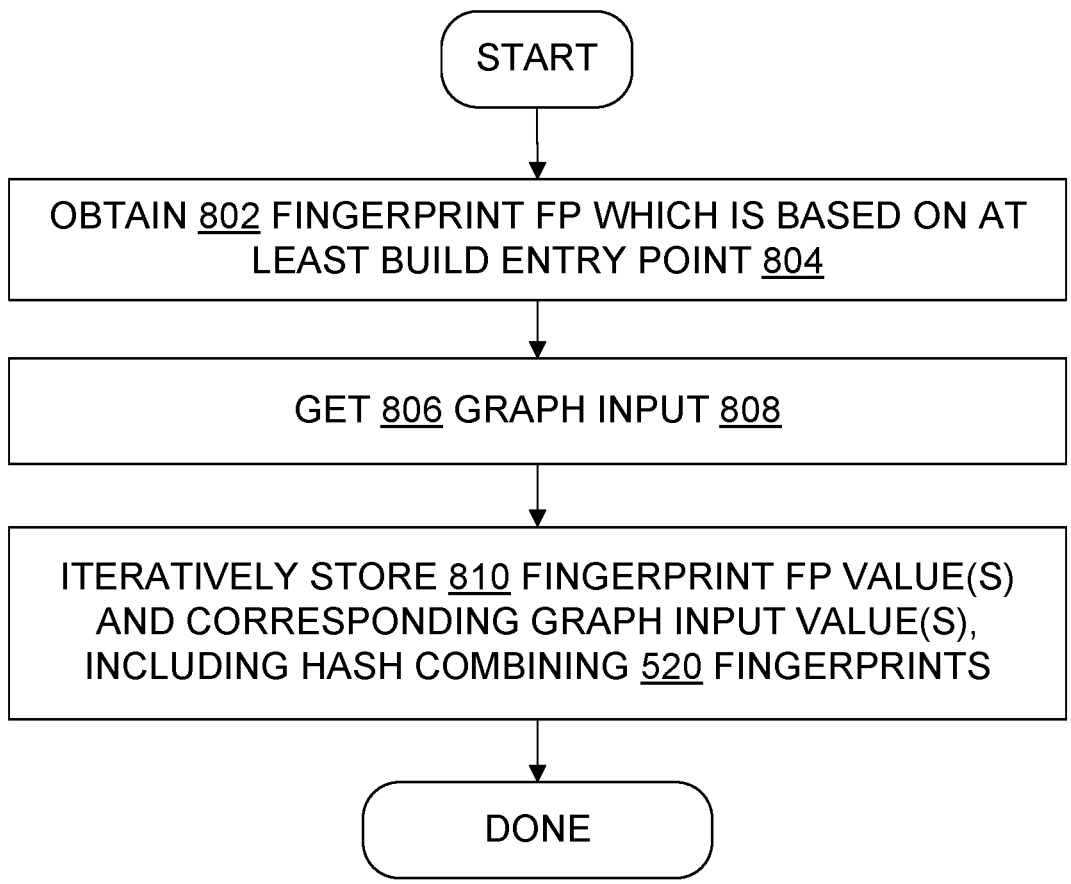
FIG. 8 is a flowchart illustrating some build graph caching methods.
Figure 9:
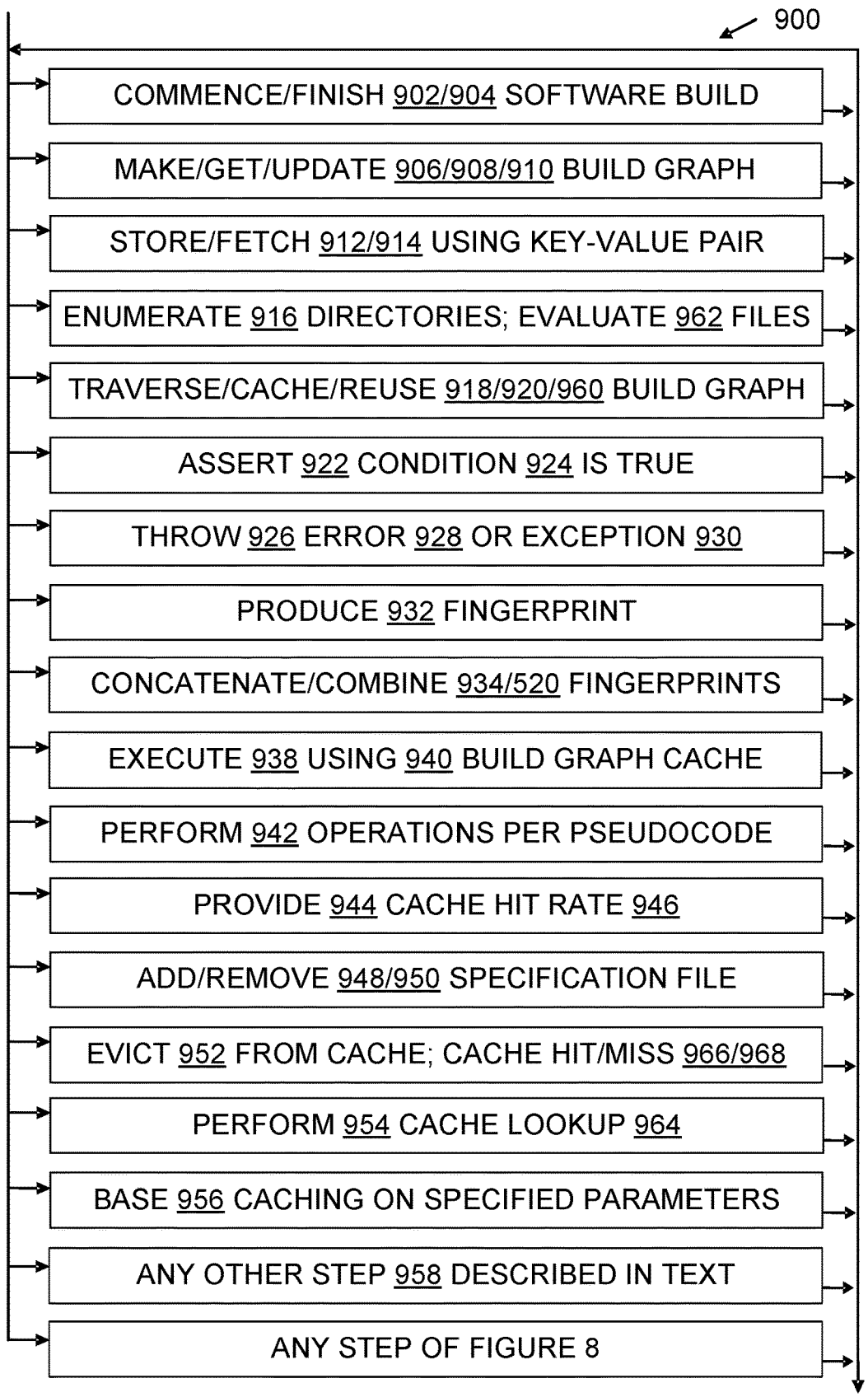
FIG. 9 is a flowchart further illustrating steps in some build graph caching methods or other memory management or software build methods.

800 methods (a.k.a. processes) which include steps shown in FIG. 8; also refers to the FIG. 8 flowchart illustrating these methods 802 obtain a fingerprint 804 entry point into a build 806 get graph input 808 graph input 810 store fingerprint value and corresponding graph input value into a key-value store 900 methods (a.k.a. processes) which include steps shown in FIG. 9; also refers to the FIG. 9 flowchart illustrating these methods, which incorporates FIG. 8

902 commence a software build 904 finish a software build 906 make a build graph 908 get a build graph 910 update a build graph 912 store (as in enter, write) a key-value pair into a key-value store 914 fetch (as in read) a value from a key-value store based on the value's key when the value was stored 912

916 enumerate directories during a software build, to determine where to get program source code files, *.cpp files, include files, libraries, and so on 918 traverse a build graph 920 cache a build graph by storing at least part of the build graph in a cache 216

922 assert a condition is met 924 condition 926 throw an error or an exception 928 thrown error 930 thrown exception; for present purposes, errors and exceptions may be treated as interchangeable, even though in other contexts a distinction may be made between them; herein they each denote failure of an assertion 510 in code 932 produce a fingerprint 934 concatenate two or more fingerprints 938 execute code 940 use a cache containing at least part of a build graph 942 perform executable operations (e.g., instructions 116) according to control flow and data flow represented by a pseudocode or a flowchart or a source code or another description with sufficient detail for one of skill to implement suitable executable operations 944 provide a cache hit rate, e.g., by performing operations which attempt to fetch content from a cache 946 cache hit rate, i.e., a measure of how often requested content is found in a cache 948 add a specification file to a software build, or to a build graph 950 remove a specification file from a software build, or from a build graph 952 evict content and its corresponding key from a cache's key-value store 954 perform a cache lookup, i.e., attempt to fetch content from a cache 956 base caching on specified parameters 958 any step discussed in the present disclosure that has not been assigned some other reference numeral 960 reuse at least a portion of a build graph instead of reconstructing it 962 evaluate specification files 964 cache lookup 966 cache hit 968 cache miss Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 220 which provides a developer with a set of coordinated computing technology development tools 122 such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific configurations, implementations, arrangements, displays, features, groupings, approaches, languages, functions, parameters, files, graphs, identifiers, or scenarios provided herein. A given embodiment may include additional or different technical features, mechanisms, sequences, components, or data structures, for instance, and may otherwise depart from the examples provided herein.

FIGS. 1 through 7 illustrate aspects of some architectures that are suitable for some embodiments taught herein. A software development environment 200 includes system 102, 400 enhanced by the addition of build graph caching functionality 216, 218 as described herein. In particular, some embodiments provide or use a software build system 202 and a storage system 210. The build system 202 builds (autonomously or under developer direction) software artifacts 208 through the operation of tools 122 to transform inputs 204 into outputs 208 that include the artifacts, pursuant to instructions 206. The tools 122 may be integrated within an IDE 220, or standalone, or a mixture of IDE and standalone tools. For example, the build system 202 may operate a compiler 122 and linker 122 to build an executable 208 by transforming source code 204 and libraries as directed by a makefile 206 or other build script 206 or project file 206 (these are examples of a "configuration file" 206), starting at a build entry point 406. More generally, the build system 202 may include continuous integration tools 122, configuration management tools 122, package management tools 122, integrated development environment software 122, or other build automation tools, whether make-based or not. Make is a build automation tool.

Figure 2:
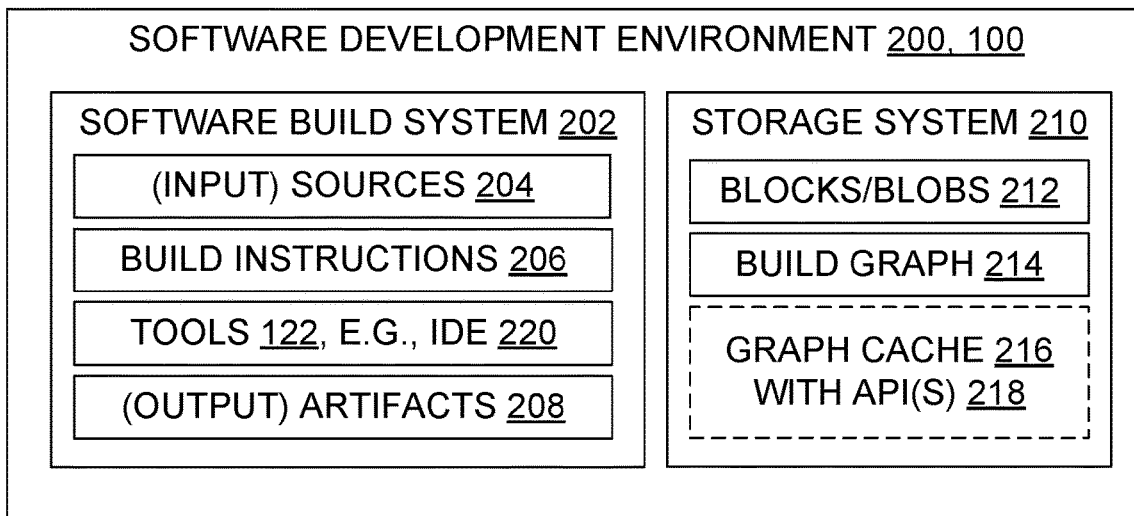
FIG. 2 is a block diagram illustrating aspects of a software development environment.
Figure 3:
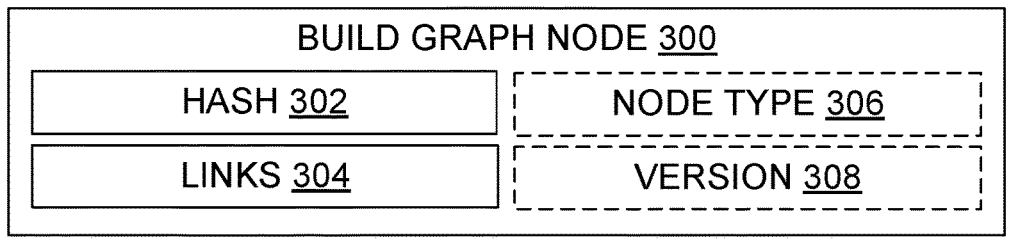
FIG. 3 is block diagram illustrating aspects of a node suitable for use in a build graph.
Figure 4:
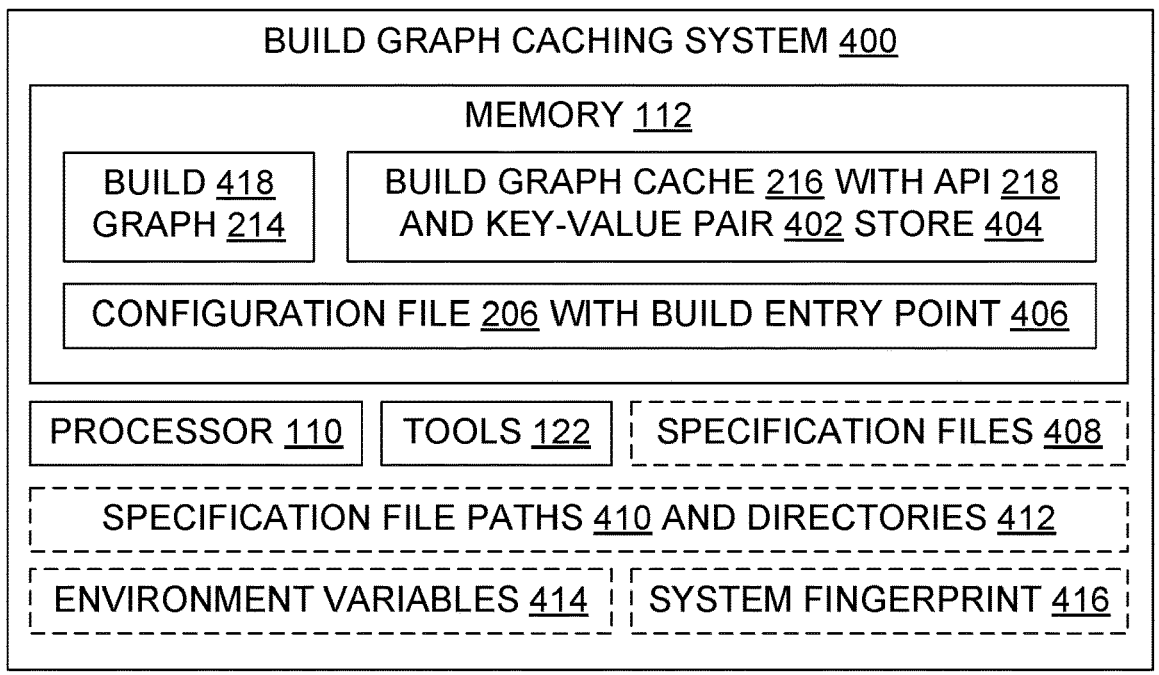
FIG. 4 is a block diagram illustrating aspects of a build graph caching system.
Figure 5:
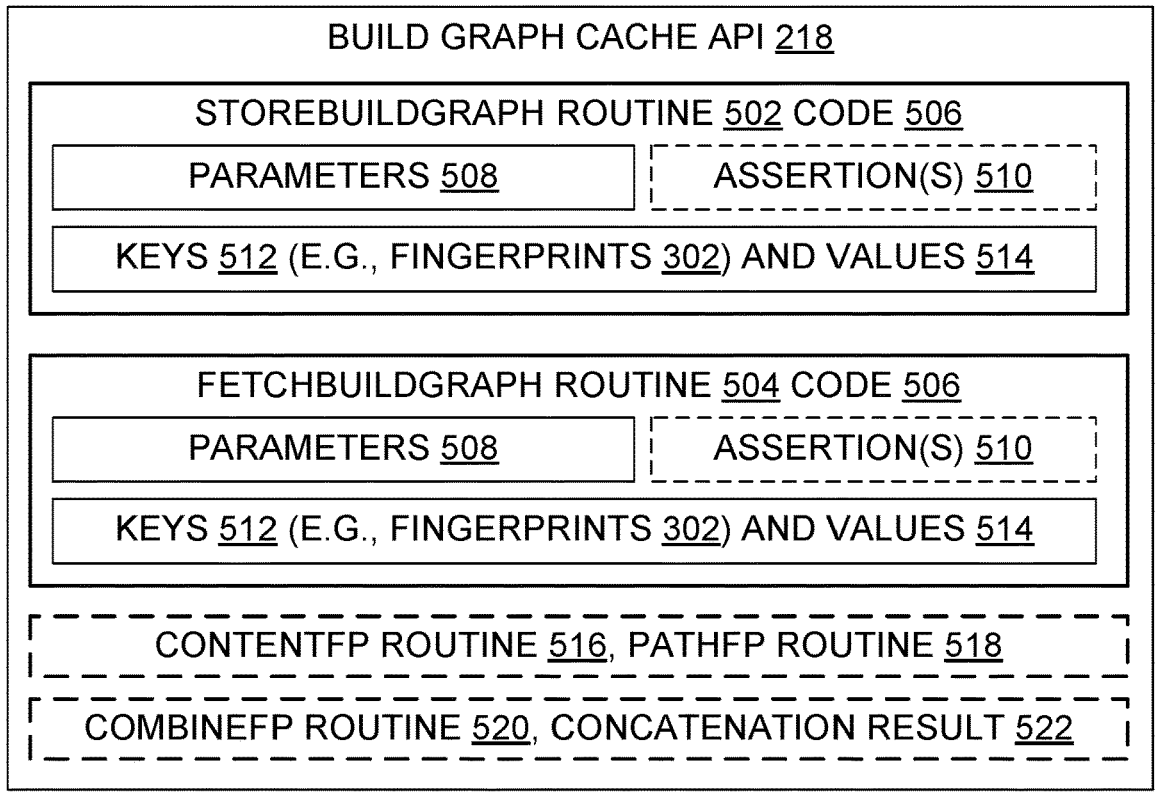
FIG. 5 is a block diagram illustrating aspects of a build graph cache API (application program interface)
Figure 6:
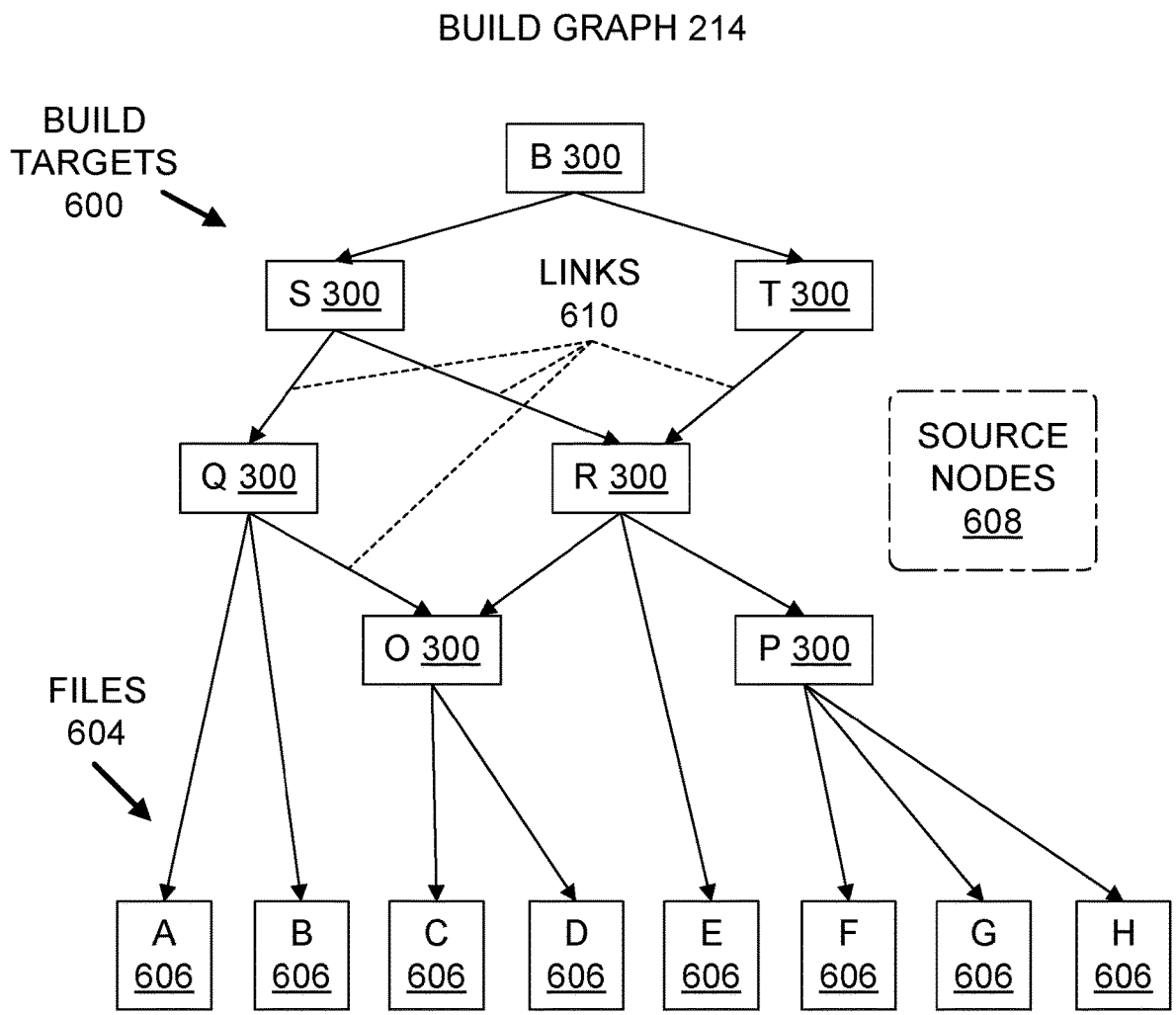
FIG. 6 is a diagram illustrating an example of a build graph.
Figure 7:
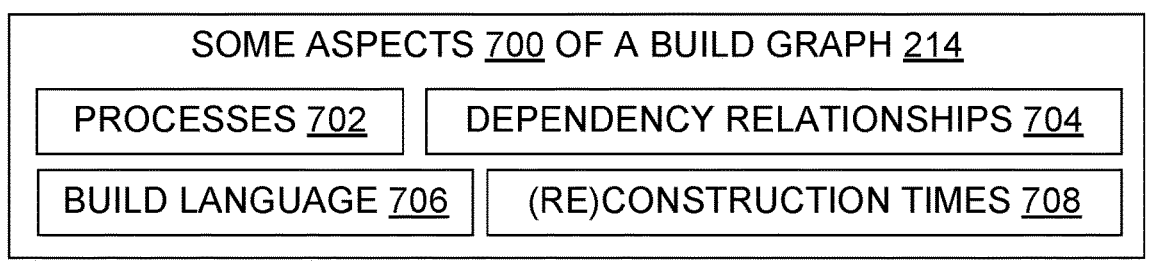
FIG. 7 is a block diagram further illustrating aspects of a build graph.

In some embodiments, a build system 202 includes tools, build instructions, and other items shown in FIG. 2, and also includes a build graph 214 which represents build dependencies 704. The build graph 214 is not necessarily complete or static. The example build graph 214 in FIG. 6 includes a root node and intermediate nodes, which are collectively designated in this example as build target nodes 300. The example build graph 214 also includes leaf nodes, designated here as build artifact file nodes 606. The example build graph nodes are connected to one another by directional links 610; the build graph is typically a directed acyclic graph (DAG). Build graphs 214 themselves, their construction, and the manner in which they direct a build are familiar to one of skill in the art. However, build graph caching as taught herein is believed to be an advance over familiar knowledge.

Some embodiments use or provide a system 400 for caching a build graph, including a processor 110, a memory 112 in operational communication with the processor, and a build graph cache 216. A build graph 214 residing at least partially in the memory contains a digital representation of dependency relationships 704 between constituent processes 702 of a software build 418. The build graph cache 216 includes a key-value store 404 which resides at least partially in the memory 112. The build graph cache 216 also includes an API 218 which provides access to content (e.g., nodes 300, keys 512, values 514, links 610) of the key-value store 404. A configuration file 206 indicates an entry point 406 of the software build 418.

In this example, a StoreBuildGraph routine 502 of the API 218 includes code 506 which upon execution by the processor 110 stores at least a portion (e.g., nodes 300 serving as values 514) of the build graph 214 in the key-value store 404. The StoreBuildGraph routine 502 has parameters 508 which include or depend upon the portion of the build graph and also include or depend upon at least one of the following: a set of specification file paths 410, a set of directories 412 enumerated during a specification evaluation, or a set of environment variable names 414.

In this example, a FetchBuildGraph routine 504 of the API 218 includes code 506 which upon execution by the processor 110 fetches build graph content (e.g., nodes 300 serving as values 514) from the key-value store 404. However, a given system S1 may do only fetches of content previously cached by another system, and thus S1 may have a FetchBuildGraph routine 504 but lack a StoreBuildGraph routine 502. Conversely, a given system S2 may do only caching of content for subsequent fetching by another system, and thus S2 may have a StoreBuildGraph routine 502 but lack a FetchBuildGraph routine 504.

In some embodiments, the StoreBuildGraph routine 502 parameters 508 further include or depend upon at least one of the following: the configuration file 206, a content hash 302 of the configuration file, or a build system fingerprint 302.

In some embodiments, the system 400 further includes an assertion 510 in StoreBuildGraph routine 502 code which asserts that a specified value is part of a graph input 808 to the StoreBuildGraph routine and which throws an error 928 or an exception 930 when the assertion is false. More generally, a given embodiment may include zero or more assertions 510 in a StoreBuildGraph routine 502, and may include zero or more assertions 510 in a FetchBuildGraph routine 504, depending on the embodiment.

In some embodiments, the configuration file 206 includes at least one of the following: a solution file, a file which points to project files as specification files 408, a workspace file, or a file which points to package files as specification files 408.

In some embodiments, the API 218 includes a ContentFp routine 516 which upon execution by the processor 110 produces a content fingerprint 302 of one or more inputs to the ContentFp routine. In some embodiments, the API 218 includes a PathFp routine 518 which upon execution by the processor 110 produces a path fingerprint 302 of one or more inputs to the PathFp routine.

In some embodiments, the API 218 includes a CombineFp routine 520 which upon execution by the processor 110 concatenates two or more fingerprints 302 to produce a concatenation result 522 and then computes a fingerprint 302 of the concatenation result.

In some embodiments, the build graph cache API 218 is build-language agnostic. Thus, the same build graph cache API 218 can be used with a variety of configuration files 206 written in various build control languages 706.

In some embodiments, the system 400 includes a build graph portion BGP that represents at least 10,000 constituent processes 702. In some of these, an average execution time 708 to construct BGP without use of the build graph cache 216 is M units of time, an average execution time 708 to construct or reconstruct BGP with use of the build graph cache 216 is N units of time, and N is less than one-tenth of M. In some other cases, N is less than one-fifth of M, or N is less than one-fourth of M, or N is less than one-third of M, or N is less than half of M. In some other cases, one or more of these relationships between N and M hold when BGP that represents at least 50,000 constituent processes 702, or when BGP that represents at least 100,000 constituent processes 702.

Other system embodiments are also described herein, either directly or derivable as system versions of described methods or configured media, informed by the extensive discussion herein of computing hardware.

Methods

Technical methods shown in the Figures or otherwise disclosed will be performed automatically, e.g., by a software build system 202 or by a storage system 210 on behalf of a build system 202, unless otherwise indicated. Methods may also be performed in part automatically and in part manually to the extent action by a human administrator or other human person is implicated, e.g., by a user initiating a software build 418 in a system 400. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which the flowchart 900 is traversed to indicate the steps performed during a method may vary from one performance of the method to another performance of the method. The flowchart traversal order may also vary from one method embodiment to another method embodiment. Steps may be shown together in a single box in the flowchart, for convenience of illustration, but nonetheless be performed separately, or in a different order than shown, or one may be performed without the other(s). Steps may also be omitted, combined, renamed, regrouped, be performed on one or more machines, or otherwise depart from the illustrated flow, provided that the method performed is operable and conforms to at least one claim.

Some embodiments use or provide a method for using 940 a build graph cache 216 of a software build 418, with the method including performing 942 operations (e.g., instructions 116) according to a StoreBuildGraph routine 502 pseudocode or operations according to a FetchBuildGraph routine 504 pseudocode, or both. In some of these embodiments the StoreBuildGraph routine pseudocode includes:

```
1:  fp ← CFP
2:  loop
3:      (s, v) ← Cache.Store( fp, IsEmpty(GI) ? G : GI)
4:      if s = Conflict then
5:          if IsEmpty(GI) then
6:              if (v is Graph) then return v
7:              else
8:                  fp ← fp ⊗ GraphInputFp(v)
9:          else
10:             fp ← fp ⊗ GraphInputFp(v)
11:             GI ← GI – v
12:     else
13:         if ¬IsEmpty(GI) then
14:             fp ← fp ⊗ GraphInputFp(GI)
15:             GI ← GI – GI
16:         else return G
```

In some embodiments, the FetchBuildGraph routine pseudocode includes:

```
1:  fp ← CFP
2:  loop
3:      v ← Cache.Fetch( fp )
4:      if v = None then return None
5:      else if v is Graph then return v
6:      else
7:          fp ← fp ⊗ GraphInputFp(v)
```

In these pseudocode listings, line numbers are given for convenient reference. Other suitable pseudocode listings do not necessarily have numbered lines.

Also, in these pseudocode listings the following symbol meanings and acronyms are used, which are likewise optional is other suitable pseudocode listings:

← represents assignment;

CFP represents a fingerprint 302 of a configuration file 206;

GI represents graph input 808 which includes or depends upon at least a set of specification file paths 410, a set of directories 412 enumerated during a specification evaluation, a set of environment variable names 414, or a combination thereof;

Cache.Store is a routine which stores content in a key-value cache 404;

(s, v) represents a Cache.Store routine result, with s=Success indicating success storing value v in the key-value cache and s=Conflict indicating value v 514 was already stored in the key-value cache;

Cache.Fetch is a routine which fetches content from the key-value cache;

G represents at least a portion of a build graph 214; please refer to the discussion of Algorithm 1 below for information about the terminology "v is Graph";

IsEmpty(GI)?G:GI evaluates as G when GI is empty and evaluates as GI when GI is not empty;

¬ represents logical negation;

¬IsEmpty(GI) evaluates as true when GI is not empty and otherwise evaluates as false;

⊗ represents a fingerprint combiner 520;

fp←fp ⊗ GraphInputFp(v) combines fingerprint fp 302 with v's fingerprint 302;

fp←fp ⊗ GraphInputFp(GI) combines fingerprint fp 302 with GI's fingerprint 302;

GI←GI–v removes v from the graph input GI 808;

GI←GI–GI makes subsequent graph input 808 empty;

v=None indicates a cache miss; and v is Graph indicates a cache hit.

In some embodiments, the method includes performing 942 operations (e.g., instructions 116) according to the StoreBuildGraph routine 502 pseudocode, thereby storing 912 the build graph portion G, and then performing 942 operations according to the FetchBuildGraph routine 504 pseudocode, thereby fetching 914 at least part of the stored build graph portion G.

In some embodiments, the method provides 944 a build graph cache hit rate 946 of at least 80%, in that at least 80% of Cache.Fetch calls to fetch 914 a portion of the build graph 214 succeed. In other embodiments, the hit rate 946 is at least 90%, or at least 75%, or at least 70%, or at least 60%, or at least 50%.

In some embodiments, the method includes evicting 952 a key-value pair 402 from the key-value cache after previously storing 912 the key-value pair using the Cache.Store routine. Eviction 952 may be based, e.g., on an LRU approach with evicts the least recently used content when the store 404 encounters a storage space limitation.

In some embodiments, combining 520 fingerprints includes hashing 302 a result of concatenating 934 the fingerprints. For example, CombineFp(h1, h2) may be performed and implemented as Hash(Concatenate(h1, h2)), where Concatenate(h1, h2) is h1 concatenated with h2, and Hash is a SHA* hash (secure hash algorithm), an MD* hash (message digest), or another hash computation.

In some embodiments, the pseudocode includes an assertion 510 between StoreBuildGraph routine pseudocode lines 7 and 8 shown above, and again between StoreBuildGraph routine pseudocode lines 9 and 10. This assertion asserts 922 the following condition 924: v is in the graph input GI. Execution 938 of the assertion 510 results in 926 an error 928 or an exception 930 when v is not in the graph input GI.

In some embodiments, the method includes adding 948 a specification file 408 to the software build 418, or removing 950 a specification file 408 from the software build 418, or both. An edit to a file F may be considered for present purposes the removal 905 of file F in its pre-edit version followed by the addition 948 of F in its post-edit version. Changes to specification files may be accomplished by modifying the configuration file 206. Then updated fingerprints 302 are stored 912 by performing 942 operations (e.g., instructions 116) according to the StoreBuildGraph routine pseudocode.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as fingerprints 302, a build graph cache 216 with an API 218 and a key-value store 404, a StoreBuildGraph routine 502, and a FetchBuildGraph routine 504, in the form of data 118 and instructions 116, read from a removable storage medium 114 and/or another source such as a network connection, to form a configured storage medium. The configured storage medium 112 is capable of causing a computer system to perform technical process steps for build graph caching operations, as disclosed herein. The Figures thus help illustrate configured storage media embodiments and process embodiments, as well as system and process embodiments. In particular, any of the process steps illustrated in FIG. 8 or 9, or otherwise taught herein, may be used to help configure a storage medium to form a configured storage medium embodiment.

Some embodiments provide or use a storage medium 114 configured with code which upon execution by one or more processors 110 performs a method for caching 920 a build graph 214 using a build graph cache 216, the method including obtaining 802 a fingerprint fp of content which includes a build entry point of the build graph, getting 806 graph input GI, and iteratively storing 810 fingerprint fp values and corresponding GI values in a key-value store of the build graph cache. In some embodiments, getting graph input GI gets 806 graph input 808 which includes one or more of the following: a set of specification file paths, a set of directories enumerated during a specification evaluation 962, or a set of environment variable names. In some embodiments, iteratively storing 810 includes hash combining 520 fingerprint fp values with fingerprint values of graph input.

Some embodiments include performing 954 a chain of cache lookups 964 for storing the build graph, including a cache lookup 954 which uses a content fingerprint 302 of a main specification file 408.

Some embodiments include code 506 which upon execution by one or more processors fetches 914 at least a portion of the build graph 214 from the key-value store of the build graph cache.

Some embodiments combine the configured storage medium 114 (which may be viewed as an article of manufacture under patent law) with a manufactured computing system 102 which contains the one or more processors 110 and also contains digital memory 112 in operable communication with the one or more processors.

In some embodiments, the method includes asserting 922 a condition 924 in which a value v fetched 914 from the key-value store of the build graph cache matches a graph input, and raising 926 an error or an exception when the condition does not exist.

Some Additional Examples and Considerations

The following discussion is provided to enhance understanding of the teachings herein. However, details presented here are not necessarily required for a sufficient understanding by one of skill in the art, or to satisfy any legal requirement.

By way of introduction, some modern build systems 202 build software by constructing build graphs 214. A build graph 214 is an acyclic process dependency graph whose nodes 300 represent processes 702 that need to be executed to build the software, and edges 610 represent dependency relations between connected processes. A build graph is generally constructed by evaluating/executing input build specification files 408 (a.k.a. specification files, or spec files). This evaluation 962 of spec files can involve reading environment variables 414 and enumerating 916 members (file or directory entries) of directories 412.

Build graph constructions can be expensive (in memory 112 and processor 110 time 708) in big builds that consist of many build specification files. For example, constructing 906 the build graph 214 for a Microsoft Office® product build (mark of Microsoft Corporation) that consists of ~80,000 spec files, on a Gen5 machine (e.g., a system 202 with Machine with 40 cores, 256G RAM, and solid state disk), takes up to 10 minutes 708, and results in a build graph that has ~376,000 processes 702. However, these particular spec files 408 do not change frequently, and thus, previously constructed build graphs can be largely reused if they are stored in a cache 216. On a desktop system 202, with relatively small builds, one approach can be saving the last recently constructed build graph on disk 112. However, for building performed in the cloud, as may be done when performing large Office® product builds, the build graph is more efficiently and effectively stored in a shared cache.

Caching build graphs is non-trivial in part because, to reuse 960 a build graph, one needs to know the spec files 408 from which the build graph is constructed 906. These spec files are not known prior to the spec evaluation 962. For example, these spec files can have conditions based on environment variables 414, and these conditions can determine processes 702 that will be included in the build graph 214 or determine additional spec files 408 to be evaluated. Similar considerations apply for directory 412 enumerations 916. The evaluation 962 of spec files can involve enumerating 916 source files 608 to be included in the build graph, or enumerating 916 additional spec files 408 to be evaluated 962.

Some embodiments provide or use tools and techniques (e.g., data structures and algorithms) for caching 920 build graphs, according to teaching presented herein. Some use a key-value store 404 as the cache's storage and retrieval mechanism. The keys 512 of the cache are the fingerprints 302 of graph inputs 808. A graph input 808 may include (and in some embodiments, consists of) a set of spec files 408, a set of environment variables 414, and a set of enumerated directories 412 (i.e., directories whose entries are enumerated 916). The values 514 of the cache can be graph inputs 808 or build graphs 214. Without loss of generality, one may assume the presence and availability of a main specification file from which the evaluation starts. Techniques presented may perform 954 a chain of cache lookups 964 for storing and fetching a build graph.

For storing a build graph 214, caching code 218, 506 is given a graph input 808 used to construct the build graph. The code first tries to store the graph input before storing the build graph. The code starts with a cache lookup using the content fingerprint 302 of the main specification file 206. If the lookup results in a cache hit 966 and the cache hit value is another graph input, then the code computes the fingerprint 302 of the graph input 808, and uses that fingerprint as the key 512 for the next cache lookup in order to store the difference between the current graph input and the graph input that was just obtained from the cache. Only when the graph input becomes empty, does the code store the build graph. If the cache lookup results in a cache miss 968, then the current graph input (possibly after a sequence of set differences) is stored 912 to the cache, and then its computed fingerprint is used to store 912 the build graph.

For fetching 914 a build graph, the code starts with the cache lookup 964 using the content fingerprint of the main specification file 206. If the lookup results in a graph input 808, then the code computes 302 the fingerprint of that graph input as the key 512 for the next cache lookup. This chain of lookups stops when the code obtains 908 a build graph or encounters a cache miss 968.

The effectiveness of graph caching as taught herein has been measured by building large commercial products in a cloud environment 100. Results show a graph cache hit rate 946 above 90%, and a reduction in the time 708 to have a ready-to-execute build graph 214 by over 90%. The average number of cache lookups 964 that result in a cache hit 966 was measured at about two. This result indicates that most of the build graph changes in the example tested are due to changes 948, 950 in the content of spec files, or values of environment variables, or memberships of enumerated directories. The longest cache lookups seen for both cache hits and misses is about three.

As to the graph caching tools and techniques themselves, some assumptions apply to at least some embodiments. One assumption is that build graphs 214 are static. Another assumption is that the cache 216 can detect whether storing a key-value pair 402 would result in a conflict.

Some build systems allow for changing the build graph dynamically during the build. The first assumption restricts the mutability of the graph 214. That is, once the build graph construction is finished and before the build 418 starts, the graph becomes immutable. This restriction makes the build graph unaffected by build (intermediate) results.

The second assumption says that if a key-value (k,v) pair 402 is to be stored to the cache, but the key k has already been mapped to some value v0 in the map, then the cache API 218 will return a conflict status along with the existing value v0. This cache conflict mechanism is leveraged in the graph caching technique. The value v0 can be an existing graph input to be validated, and is used to retrieve subsequent graph inputs from the cache.

As to build specifications and stages, the graph caching technique in this example is build-language agnostic. The corresponding build system 202 may use any one or more build languages 706 and tools 122, so long as the build system follows the assumptions stated above. Some example of spec files 408 and configuration files 206, 408 include project files, package files, build files, and others, used with tools from a variety of commercial vendors or community software project repositories.

In this example, the build 418 process may be considered to have or consist of two stages. The first stage is the construction 906 of the build graph from the spec files. The second stage is the execution 938 of the processes in the build graph according to the dependency relation, i.e., a process 702 is executed if all of its dependencies have successfully been executed. This disclosure focuses on the first stage of the build process, namely, build graph construction. The construction of the build graph corresponds to evaluating 962 spec files, which in turn often involves reading environment variables 414 and enumerating 916 members (file or directory entries) of directories.

This explanation of graph caching assumes, without loss of generality, that the build system has a single main spec file, called the configuration file 206, which is or includes the entry point 406 of the build 418. The configuration file 206 contains the configuration values and options used for the build. The configuration file 206, 408 also specifies pointers to other spec files 408 which are to be evaluated 962. These spec files may in turn include other spec files, possibly based on some conditions 924. This kind of build organization can be found in many build systems. For example, the MsBuild™ tool has a solution file as its configuration file 206, and has project files as its spec files (mark of Microsoft Corporation). As another example, the Bazel® tool has a workspace file as its configuration file 206, and has package files as its spec files (mark of Google LLC).

As to graph inputs 808, consider the following. For a file f, the content fingerprint of f is the fingerprint 302 of the content of f and the path fingerprint of f is the fingerprint 302 computed from the path of f. One may denote by ContentFp (t) 516 the content fingerprint of f and one may denote by PathFp(f) 518 the path fingerprint of f. Similarly for directory d, one may denote by PathFp(d) the path fingerprint of d. Given two fingerprints $fp_1$ and $fp_2$, the operation $fp = fp_1 \otimes fp_2$ combines 520 $fp_1$ and $fp_2$ to form the fingerprint fp. This combination 520 can be performed by concatenating 934 $fp_1$ and $fp_2$, followed by computing 302 the fingerprint of the concatenation result 522. Given a list $fp=fp_0, \ldots, fp_n$ of fingerprints, one may denote by CombineFp(fp) 520 the fingerprint obtained by combining all fingerprints in fp, i.e., CombineFp(fp)=$fp_0 \otimes \ldots \otimes fp_n$.

A build system B may have a fingerprint. This build system fingerprint can be computed from the build system's executable files. For example, let $b_0, \ldots, b_n$ be build system executable files; then the build system's fingerprint is $\otimes_{i=0}^{n} F_p^{(\hat{b}_i, \#(b_i))}$. Instead of content hashes of build system files, one can also use, if exists, the unique id of the build system, e.g., a source control commit id.

As mentioned, this build system has a single main spec file, called the configuration file. One may denote by C the configuration file 206 of the build.

In this example, a graph input GI=(Specs,EnumDirs, EnvVars) is a triple (a.k.a. tuple, or 3-tuple), where Specs is a set of paths 410 of spec files 408, EnumDirs is a set of paths 410 of directories 412 whose entries were enumerated 916 during spec evaluation 962, and EnvVars is a set of environment variable names 414.

Additional helper functions may also be implemented and provided as pieces of code 506. For example, when given a directory d, Member(d)=$f_1, \ldots, f_n$ returns the members (file and directory entries) of d. Member(d) basically enumerates 916 (or performs directory enumeration over) the file or directory entries of d. The directory fingerprint of d, denoted by DirFp(d), is computed by combining 520 the path fingerprints of d's members, i.e., DirFp(d)=CombineFp(PathFp($f_1$), ..., PathFp($f_n$)).

Given an environment variable e, Env(e) returns the value of e. One may assume that both environment variable 414 name e and its value Env(e) is of type string text. Given a string text t, one may denote by StringFp(t) the fingerprint of t. For simplicity, one may assume that the function Env is total. Alternatively, if an environment variable e is undefined, then Env(e) can be a special null value.

In this example, the fingerprint 302 of a graph input GI, denoted by GraphInputFp(GI), is obtained by combining 520 the following fingerprints:
CombineFp(PathFp(f),ContentFp(f)) for all f∈Specs;
CombineFp(PathFp(d),DirFp(d)) for all d∈EnumDirs; and
CombineFp(StringFp(e),StringFp(Env(e))) for all e∈EnvVars.

For simplicity, one may have a special content fingerprint Absent to denote a non-existent file or directory.

Given two graph inputs GI1 and GI2, the subtraction operation GI=GI1−GI2 returns a new graph input GI whose components contain items in GI1 except those in GI2. The operation IsEmpty(GI) returns true iff (if and only if) the graph input GI is empty.

As to the build graph cache 216, in this example a cache 216 Cache is implemented with a key-value store 404 that has store and fetch operations. Cache.store(k,v) tries to store value v with key k. The result of this operation is a tuple (s,v0) 402 where s is a store status that can either be Success or Conflict, and v0 is the existing value in the cache if s is Conflict, otherwise None. Cache.fetch(k) tries to fetch a value indexed with key k from the cache 216. The operation returns None if no value is indexed with k. This example assumes that the cache can evict 952 its contents.

For storing 912 a build graph G into the cache 216, assume that the code 506 parameters include the configuration file C and the graph input GI, or that these data are otherwise available. The graph input GI can be obtained by tracking or collecting spec files 408 that are read, directories 412 whose entries are enumerated 916, and environment variables 414 that are accessed during the evaluation 962 of spec files.

Algorithm 1 below shows an example function for storing a build graph to the cache 216. "//" indicates comments or remarks. ConfigurationFile, GraphInput, and Graph are, respectively, sets of configuration files 206, graph inputs 808, and build graphs 214. One can think of those sets as types in a programming language. In the algorithm, the ← symbol denotes the assignment operator. Given a condition c, Assert(c) ensures that c holds, otherwise it throws 926 an error. For fetching 914 a build graph from the cache 216, the code 506 uses only the configuration file as a parameter, as shown by the example function in Algorithm 2.

Pseudocode representing Algorithm 1 and Algorithm 2 is shown below. One of skill will understand that this pseudocode may be implemented using any one or more programming languages to obtain an executable code implementation of each Algorithm. One of skill will also understand that in some implementations, variations may depart from the pseudocode. For instance, Assert( ) error checking may be modified to permit in-pace correction of errors, or be omitted. As another variation, instead of passing C: ConfigurationFile as a parameter, and embodiment could compute the fingerprint of configuration file C and then pass that fingerprint as a parameter of StoreBuildGraph( ) or FetchBuildGraph( ) or both. Global variables could also be used to pass data into routines.

Algorithm 1: Storing Build Graph to Cache

---
Algorithm 1: Storing build graph to cache
---

```
 1: function StoreBuildGraph(C : ConfigurationFile, GI : GraphInput, G : Graph)
 2:     fp ← ContentFp(C)
 3:     loop
 4:         (s,v) ← Cache.store(fp,IsEmpty(GI) ? G : GI)
 5:         if s = Conflict then
 6:             if IsEmpty(GI) then
 7:                 if v is Graph then return v
 8:                 else
 9:                     Assert(v is GraphInput)        // assert that v is a graph input
10:                     fp ← fp ⊗ GraphInputFp(v)      //combine fingerprint fp with v's fingerprint
11:             else
12:                 Assert(v is GraphInput)            // assert that v is a graph input
13:                 fp ← fp ⊗ GraphInputFp(v)          // combine fingerprint fp with v's fingerprint
14:                 GI ← GI − v                        // remove v from the graph input GI
15:         else
16:             if ¬IsEmpty(GI) then
```

| Algorithm 1: Storing build graph to cache | | |
|---|---|---|
| 17: | fp ← fp ⊗ GraphInputFp(GI) | // combine fingerprint fp with GI's fingerprint |
| 18: | GI ← GI − GI | // make subsequent graph input empty |
| 19: | else return G | |

Algorithm 2 for fetching content from the cache follows readily from Algorithm 1, the storing algorithm, when one of skill is informed by teachings herein:

Algorithm 2: Fetching Build Graph from Cache

```
1: function FetchBuildGraph(C : 
ConfigurationFile)
2:      fp ← ContentFp(C)
3:      loop
4:          v ← Cache.fetch(fp)
5:          if v = None then return None     // cache miss
6:          else if v is Graph then return v  // cache hit
7:          else                              // assert that v is a graph
8:              Assert(v is GraphInput)       input
9:              fp ← fp ⊗ GraphInputFp(v)    // combine fingerprint fp
                                                with v's fingerprint
```

With regard to the terminology "v is GraphInput" and "v is Graph" the following observations are offered. One alternative notation for "v is Graph" is "v is Build Graph". Another alternative notation is "v∈GraphInput" and "v∈Graph". Another alternative is "v is-instance-of Graph". In Algorithm 1, parameter G of type Graph is the build graph that the algorithm tries to store. One may also understand the pseudocode to say that G is in a set Graph of build graphs. The expression "v is Graph" in the algorithm returns true if v is an instance of Graph, e.g., G is a build graph. In a programming language, "v is Graph" may be represented in various ways, depending on the programming language, e.g., in Java® (mark of Oracle America, Inc.) as "v instanceof Graph", in C# as "v is Graph", in C++ as "dynamic_cast<Graph>( )!=null_ptr", and so on.

To further illustrate these algorithms, the following examples are provided. The graph fetching algorithm follows readily from the storing algorithm, when one of skill is informed by teachings herein. So the examples focus on the graph storing algorithm. For simplicity, assume that the graph input 808 consists only of the spec file paths 410. For example, a graph input GI={$f_1, \ldots, f_n$} consists of spec files $f_1, \ldots, f_n$.

Example 1

Assume that Cache is initially empty. Assume also that one has the following setting:

The content fingerprint of configuration file is ContentFp(C)=0.

The graph input GI={$f_1, f_2$}:

Spec file $f_1$, such that CombineFp(PathFp($f_1$),ContentFp($f_1$))=1.

Spec file $f_2$, such that CombineFp(PathFp($f_2$),ContentFp($f_2$))=2.

The constructed build graph G1 to be stored.

When an embodiment runs StoreBuildGraph(C,GI,G1), the cache will have the following entries:

| Keys | Values |
|---|---|
| 0 | {$f_1, f_2$} |
| 0 ⊗ CombineFp(1, 2) | G1 |

Now modify $f_1$, such that CombineFp(PathFp($f_1$),ContentFp($f_1$))=3, and try to store the resulting graph G2. The following trace shows the runtime behavior of StoreBuildGraph(C,GI={$f_1, f_2$},G2):
1. Initially, fp=0.
2. Cache.store(fp,GI={$f_1, f_2$}) results in Conflict, and the conflicting value is a graph input {$f_1, f_2$}.
3. fp=0⊗CombineFp(3,2).
4. Cache.store(fp,G2) results in Success.

Now, this cache has the following entries:

| Keys | Values |
|---|---|
| 0 | {$f_1, f_2$} |
| 0 ⊗ CombineFp(1, 2) | G1 |
| 0 ⊗ CombineFp(3, 2) | G2 |

Now modify $f_2$, such that CombineFp(PathFp($f_2$),ContentFp($f_2$))=4, and try store the resulting graph G3. The runtime behavior of StoreBuildGraph(C,GI={$f_1, f_2$},G3) is as follows:
1. Initially, fp=0.
2. Cache.store(fp,GI={$f_1, f_2$}) results in Conflict, and the conflicting value is a graph input {$f_1, f_2$}.
3. fp=0⊗CombineFp(3,4).
4. Cache.store(fp,G3) results in Success.

Now, this cache has the following entries:

| Keys | Values |
|---|---|
| 0 | {$f_1, f_2$} |
| 0 ⊗ CombineFp(1, 2) | G1 |
| 0 ⊗ Combine(3, 2) | G2 |
| 0 ⊗ CombineFp(3, 4) | G3 |

Example 2

Initially Cache is empty. One has the following setting:

The content fingerprint of configuration file is ContentFp(C)=0.

The graph input GI={$f_1, f_2$}:

Spec file $f_1$, such that CombineFp(PathFp($f_1$),ContentFp($f_2$))=1.

Spec file $f_2$, such that CombineFp(PathFp($f_2$),ContentFp($f_2$))=2.

The constructed build graph G1 to be stored.

When an embodiment runs StoreBuildGraph(C,GI,G1), the cache will have the following entries:

| Keys | Values |
|---|---|
| 0 | $\{f_1, f_2\}$ |
| $0 \otimes \text{CombineFp}(1, 2)$ | G1 |

Suppose circumstances add another spec file $f_3$ such that CombineFp(PathFp($f_3$),ContentFp($f_3$))=3. Adding 948 a spec file changes either the config file or some other spec files. If nothing changes, then some directory membership has changed, and an embodiment may handle it by considering directory memberships as part of graph inputs. For simplicity of this example, assume without loss of generality that $f_1$ changes such that CombineFp(PathFp($f_1$),ContentFp ($f_2$))=4. Storing the new constructed graph G2 produces the following trace:
1. Initially fp=0.
2. Cache.store(fp,GI=$\{f_1,f_2,f_3\}$) results in Conflict, and the conflicting value is a graph input $\{f_1,f_2\}$.
3. fp=$0 \otimes$CombineFp(4,2) and GI=$\{f_3\}$.
4. Cache.store(fp,GI=$\{f_3\}$) results in Success.
5. fp=$0 \otimes$CombineFp(4,2)$\otimes$3 and GI=$\{\ \}$.
6. Cache.store(fp,G2) results in Success.

Now this cache has the following entries:

| Keys | Values |
|---|---|
| 0 | $\{f_1, f_2\}$ |
| $0 \otimes \text{CombineFp}(1, 2)$ | G1 |
| $0 \otimes \text{CombineFp}(4, 2)$ | $\{f_3\}$ |
| $0 \otimes \text{CombineFp}(1, 2) \otimes 3$ | G2 |

Now suppose circumstances lead to removal 950 of spec file $f_2$, and suppose that this removal changes spec file $f_1$ such that CombineFp(PathFp($f_1$),ContentFp($f_2$))=5. Storing the new constructed graph G3 produces the following trace:
1. Initially fp=0.
2. Cache.store(fp,GI=$\{f_1,f_3\}$) results in Conflict, and the conflicting value is a graph input $\{f_1,f_2\}$.
3. fp=$0 \otimes$CombineFp(5,CombineFp(PathFp($f_2$),Absent)) and GI=$\{f_3\}$. Note that we have the special value Absent as the content hash for non-existent files.
4. Cache.store(fp,GI=$\{f_3\}$) results in Success.
5. fp=$0 \otimes$CombineFp(5,CombineFp(PathFp($f_2$),Absent)) $\otimes$3 and GI=$\{\ \}$. Note that we have the special
6. Cache.store(fp,GI3) results in Success.

Now this cache looks like the following:

| Keys | Values |
|---|---|
| 0 | $\{f_1, f_2\}$ |
| $0 \otimes \text{CombineFp}(1, 2)$ | G1 |
| $0 \otimes \text{CombineFp}(4, 2)$ | $\{f_3\}$ |
| $0 \otimes \text{CombineFp}(1, 2) \otimes 3$ | G2 |
| $0 \otimes \text{CombineFp}(5, \text{CombineFp}(\text{PathFp}(f_2),\text{Absent}))$ | $\{f_3\}$ |
| $0 \otimes \text{CombineFp}(5, \text{CombineFp}(\text{PathFp}(f_2),\text{Absent})) \otimes 3$ | G3 |

Build graph caching as taught herein may improve computing system functionality to provide beneficial results such as reduced processing times and re-use of previously computed data. The effectiveness of such a graph caching technique may rely in part on the relatively cheap operations that it performs, e.g., computing fingerprints and cache lookups. By contrast, evaluating 962 build specification files involves substantially greater computational expense: reading and computing fingerprints of the files, parsing them, possibly type-checking them, and then either interpreting the abstract syntax trees or converting them into some executable and executing them.

The effectiveness of graph caching as taught herein may be bound to disk I/O and network communication. Computing fingerprints, in particular content fingerprints, can be expensive on busy I/O. However, this cost also occurs in the evaluation of build specification files. Particularly for storing a build graph, the content fingerprints are already known from the spec evaluation. Note also that if there are network bottlenecks, then cache lookups can be expensive.

One investigation included assessment of build graph caching techniques when building software products in a cloud environment. The investigation observed builds over a period of thirty days. Table 1 summarizes some resulting effectiveness measurements. The first row shows the effectiveness over different build flavors (platform and configuration). Different flavors have different build sizes. The second row shows the effectiveness on a x64-retail queue where the build has ~80,000 specification files and the resulting build graph has ~376,000 processes.

TABLE 1

Effectiveness of build graph caching technique.

| Build flavors | # Builds | Cache hit | Avg. Graph construction | Avg. Graph caching | Perf. gain |
|---|---|---|---|---|---|
| All flavors | 548,721 | 92.7% | 228 s | 12 s | 94.7% |
| x64-retail | 3,856 | 89.6% | 581 s | 39 s | 93.2% |

The graph fetching algorithm includes a sequence of cache lookups. Over all investigated build flavors, the average number of cache lookups that result in cache hit is 2. This indicates that most of the build graph changes are due to changes in the content of spec files or changes in the values of environment variables that do not cause addition or removal of spec files. The longest cache lookups seen for both cache hits and misses is 3.

Some Additional Combinations and Variations

Any of these combinations of code, data structures, logic, components, communications, parameters, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, according to teachings provided herein, software build solutions 400 are tailored to cache 920 a build graph 214. The build graph is a dependency graph used to guide processes 702 which are performed during a software build 418. Build graph caching 920 provides faster builds after changes 948, 950 are made to source code files or other build constituents, allowing the retrieval 914 from cache of previously constructed build graph content which is unaffected by the change. The build graph cache 216 includes a key-value store 404 with an API 218 providing StoreBuildGraph 502 and FetchBuildGraph 504 routines. Keys 512 include fingerprints (hashes) 302 of graph input 808 parameter 508 values 514, such as specification file paths 410, enumerated directories 412, and environment variables 414. Fingerprints 302 may be combined 520 by concatenation 934 and further hashing 302. The API 218 may be build-language agnostic. Pseudocode for cache store and fetch routines, and examples of their operation, are disclosed.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system for caching a build graph, comprising:
a processor;
a memory in operational communication with the processor;
a build graph which resides at least partially in the memory, the build graph containing a representation of dependency relationships between constituent processes of a software build;
a build graph cache including a key-value store which resides at least partially in the memory, the build graph cache also including an interface which provides access to content of the key-value store;
a configuration file indicating an entry point of the software build;
a store routine of the interface including code which upon execution by the processor stores at least a portion of the build graph in the key-value store, the store routine having parameters which include or depend upon the portion of the build graph and also include or depend upon at least one of the following: a set of specification file paths, a set of directories enumerated during a specification evaluation, a set of environment variable names; and a fetch routine of the interface including code which upon execution by the processor fetches build graph content from the key-value store.

2. The system of claim 1, wherein the store routine parameters further include or depend upon at least one of the following:
the configuration file;
a content hash of the configuration file; or
a build system fingerprint.

3. The system of claim 1, further comprising an assertion in store routine code which asserts that a specified value is part of a graph input to the store routine and which throws an error or an exception when the assertion is false.

4. The system of claim 1, wherein the configuration file includes at least one of the following:
a solution file;
a file which points to project files as specification files;
a workspace file; or
a file which points to package files as specification files.

5. The system of claim 1, wherein the interface further comprises:
a content fingerprint routine which upon execution by the processor produces a content fingerprint of one or more inputs to the content fingerprint routine; and
a path fingerprint routine which upon execution by the processor produces a path fingerprint of one or more inputs to the path fingerprint routine.

6. The system of claim 1, wherein the interface further comprises a content fingerprint routine which upon execution by the processor concatenates two or more fingerprints to produce a concatenation result and then computes a fingerprint of the concatenation result.

7. The system of claim 1, wherein the build graph cache interface is build-language agnostic.

8. The system of claim 1, wherein the system comprises a build graph portion that represents at least 10,000 constituent processes, an average execution time to construct the build graph portion without use of the build graph cache is M units of time, an average execution time to construct or reconstruct the build graph portion with use of the build graph cache is N units of time, and N is less than one-tenth of M.

9. A method for using a build graph cache of a software build, the method comprising performing operations according to a store routine and operations according to a fetch routine, wherein:
the store routine obtains a fingerprint of a configuration file, and stores at least a portion of a build graph in a key-value cache using the fingerprint as a key, the store routine also having at least one parameter which includes or depends upon at least one of the following: a set of specification file paths, a set of directories enumerated during a specification evaluation, or a set of environment variable names; and
the fetch routine fetches at least the portion of the build graph from the key-value cache using the configuration file fingerprint as the key.

10. The method of claim 9, comprising storing a build graph portion, and then fetching the stored build graph portion and reusing the build graph portion instead of reconstructing it.

11. The method of claim 9, wherein the method provides a build graph cache hit rate of at least 80%, in that at least 80% of calls to fetch a portion of the build graph succeed.

12. The method of claim 9, further comprising evicting a key-value pair from the key-value cache after previously storing the key-value pair.

13. The method of claim 9, wherein the operations performed comprise combining fingerprints at least in part by hashing a result of concatenating at least two fingerprints.

14. The method of claim 9, wherein the operations performed further comprise asserting that a particular value is in an input to the store routine, and causing an error or an exception when the value is not in the input to the store routine.

15. The method of claim 9, further comprising adding a specification file to the software build or removing a specification file from the software build, or both, and then storing updated fingerprints by performing operations according to the store routine.

16. A storage medium configured with code which upon execution by one or more processors performs a method for caching a build graph using a build graph cache, the method comprising:
obtaining a first fingerprint of a configuration file which includes a build entry point of the build graph;
getting a first graph input which includes one or more of the following: a set of specification file paths of the build graph, a set of directories enumerated during a build graph specification evaluation, a set of names of environment variables of the build graph; and
iteratively storing one or more subsequent fingerprint values and corresponding graph inputs in a key-value store of the build graph cache, said iterative storing comprising hash combining fingerprint values with fingerprint values of graph input.

17. The storage medium of claim 16, wherein the method comprises performing a chain of cache lookups for storing the build graph, including a cache lookup which uses a content fingerprint of a main specification file.

18. The storage medium of claim 16, further configured with code which upon execution by one or more processors fetches at least a portion of the build graph from the key-value store of the build graph cache.

19. The storage medium of claim 18, in combination with a manufactured computing system which contains the one or more processors and also contains digital memory in operable communication with the one or more processors.

20. The storage medium of claim 16, wherein the method comprises asserting a condition exists in which a value fetched from the key-value store of the build graph cache matches a graph input, and raising an error or an exception when the condition does not exist.

* * * * *